(12) United States Patent
He et al.

(10) Patent No.: US 11,803,366 B2
(45) Date of Patent: Oct. 31, 2023

(54) FIRMWARE UPDATING SYSTEM AND METHOD

(71) Applicant: REALTEK SEMICONDUCTOR CORP., Hsinchu (TW)

(72) Inventors: Dong-Yu He, Suzhou (CN); Meng-Yao Gu, Suzhou (CN); Jian Sun, Suzhou (CN)

(73) Assignee: REALTEK SEMICONDUCTOR CORP., Hsinchu (TW)

(*) Notice: Subject to any disclaimer, the term of this patent is extended or adjusted under 35 U.S.C. 154(b) by 282 days.

(21) Appl. No.: 17/231,119

(22) Filed: Apr. 15, 2021

(65) Prior Publication Data

US 2021/0397441 A1  Dec. 23, 2021

(30) Foreign Application Priority Data

Jun. 17, 2020 (CN) .......................... 202010551629.0

(51) Int. Cl.
| | |
|---|---|
| G06F 9/44 | (2018.01) |
| G06F 8/654 | (2018.01) |
| H04L 9/32 | (2006.01) |
| H04L 9/40 | (2022.01) |
| G06F 21/57 | (2013.01) |
| H04L 9/30 | (2006.01) |

(52) U.S. Cl.
CPC .......... *G06F 8/654* (2018.02); *G06F 21/572* (2013.01); *H04L 9/3073* (2013.01); *H04L 9/3252* (2013.01); *H04L 63/0435* (2013.01); *H04L 63/0442* (2013.01); *H04L 63/123* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,292,277 B2* | 3/2016 | Landry | .................. | G06F 8/654 |
| 10,454,674 B1* | 10/2019 | Bar-El | .................. | H04L 63/123 |
| 10,725,762 B2* | 7/2020 | Ujiie | ...................... | G06F 8/654 |

(Continued)

FOREIGN PATENT DOCUMENTS

| | | |
|---|---|---|
| TW | 201131475 A1 | 9/2011 |
| TW | 201335847 A1 | 9/2013 |

*Primary Examiner* — Qamrun Nahar
(74) *Attorney, Agent, or Firm* — Li & Cai Intellectual Property (USA)

(57) ABSTRACT

A firmware updating system and method are provided. The firmware updating method includes configuring a host to digitally sign a firmware to be updated, and configuring an electronic device to perform an authorization verification on an update tool, and only the update tool that passes the verification has an update permission. The update tool uses an encryption algorithm to encrypt the firmware to be updated that includes a digital signature. After the encryption is completed, the host sends the update tool to the electronic device through the update tool. The electronic device then uses a decryption algorithm to decrypt the received firmware to obtain the firmware to be updated including the digital signature, and write the firmware to be updated into a firmware storage area to be updated. The electronic device then verifies the digital signature in the firmware to be updated.

20 Claims, 6 Drawing Sheets

(56) References Cited

U.S. PATENT DOCUMENTS

2006/0005046 A1* 1/2006 Hars ............... G06F 21/572
　　　　　　　　　　　　　　　　714/E11.207
2013/0227543 A1* 8/2013 Chen ............... G06F 8/654
　　　　　　　　　　　　　　　　717/172
2017/0180137 A1* 6/2017 Spanier ............ G06F 8/654
2017/0293484 A1* 10/2017 Haase ............. G06F 8/654

* cited by examiner

FIRMWARE UPDATING SYSTEM AND METHOD

CROSS-REFERENCE TO RELATED PATENT APPLICATION

This application claims the benefit of priority to China Patent Application No. 202010551629.0, filed on Jun. 17, 2020 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a firmware updating system and method, and more particularly to a firmware updating system and method that can safely update a firmware online.

BACKGROUND OF THE DISCLOSURE

A firmware is a "driver" stored in an electronic device, and the electronic device operates by executing the firmware. In order to prolong service life of the electronic device and improve compatibility of the electronic device with different software and hardware environments, manufacturers need to continuously update the firmware. Firmware updating means that the user upgrades the embedded firmware in the electronic device through a specific tool, repairs vulnerabilities of previous versions of the firmware, and improves functions of the electronic device to enhance performance of the electronic device.

In the existing firmware updating manners, protection during the firmware updates is less than secure, and low security causes the firmware to be easily stolen and maliciously modified, which not only harms users, but also hurts profits for firmware manufacturers. Furthermore, since the firmware update is not performed in different storage areas, the firmware currently in use will be overwritten during the firmware update. Moreover, if the firmware update is terminated unexpectedly, the firmware update will fail and the electronic device will not be able to be used normally.

Therefore, improving the firmware updating mechanism to enhance the security of the firmware updating has become one of the important issues in the art.

SUMMARY OF THE DISCLOSURE

In response to the above-referenced technical inadequacies, the present disclosure provides a firmware updating system and method that can safely update a firmware online.

In one aspect, the present disclosure provides a firmware updating method suitable for a firmware updating system including a host and an electronic device, the host is configured to be communicatively connected to the electronic device and store a firmware to be updated, and the firmware updating method includes: configuring the host to execute a firmware generating tool to digitally sign the firmware to be updated, thereby generating the firmware to be updated including a digital signature; configuring the host to execute an update tool to transmit an update command to the electronic device; in response to the electronic device receiving the update command, configuring the electronic device to perform an authorization verification process on the update tool. The authorization verification process includes: configuring the electronic device and the update tool to generate and exchange a plurality of sets of random numbers; configuring the update tool to sign the plurality of sets of random numbers with an asymmetric encryption algorithm to generate a verification signature, and send the verification signature to the electronic device; and configuring the electronic device to verify the verification signature using the asymmetric encryption algorithm, and in response to the electronic device successfully verify the verification signature, configuring the electronic device to send a verification success signal to the update tool, otherwise, send a verification failure signal to the update tool. In response to the update tool receiving the verification success signal, the firmware updating method further includes configuring the update tool to encrypt the firmware to be updated including the digital signature with a symmetric encryption algorithm to generate an encrypted firmware, and send the encrypted firmware to the electronic device; configuring the electronic device to execute an original firmware, and decrypt the encrypted firmware with a decryption algorithm to obtain the firmware to be updated including the digital signature; configuring the electronic device to determine which of a first firmware storage area and a second firmware storage area is a firmware storage area to be updated; configuring the update tool to write the firmware to be updated including the digital signature into the firmware storage area to be updated; in response to a completion of writing the firmware to be updated including the digital signature into the firmware storage area to be updated, configuring the electronic device to execute the original firmware, and verify the digital signature by using a signature verification algorithm. In response to the electronic device successfully verifying the digital signature, an update is completed.

In another aspect, the present disclosure provides a firmware updating system, which includes an electronic device and a host. The electronic device includes a first processing unit and a first memory module. The first memory module includes a firmware execution area, a first firmware storage area, and a second firmware storage area. The firmware execution area stores an original firmware. At least one of the first firmware storage area and the second firmware storage area stores the original firmware. The host is configured to be communicatively connected with the electronic device, and the host includes a second processing unit and a second memory module. The second memory module stores an update tool, a firmware to be updated and a firmware generating tool. The host is configured to execute a firmware generating tool to digitally sign the firmware to be updated, thereby generating the firmware to be updated including a digital signature. The host is configured to execute an update tool to transmit an update command to the electronic device. In response to the electronic device receiving the update command, the electronic device is configured to perform an authorization verification process on the update tool, and the authorization verification process includes: configuring the electronic device and the update tool to generate and exchange a plurality of sets of random numbers; configuring the update tool to sign the plurality of sets of random numbers with an asymmetric encryption algorithm to generate a verification signature, and send the verification signature to the electronic device; and configuring the electronic device to verify the verification signature using the asymmetric encryption algorithm, and in response to the electronic device successfully verify the verification signature, configuring the electronic device to send a verification success signal to the update tool, otherwise, send a verification failure signal to the update tool. In response to the update tool receiving the verification success signal, the update tool is configured to encrypt the firmware to be updated including the digital signature with a symmetric encryption algorithm to generate an encrypted firmware, and send the encrypted firmware to the electronic device. The electronic device is configured to execute an original firmware, and decrypt the encrypted firmware with a decryption algorithm to obtain the firmware to be updated including the digital signature. The electronic device is configured to determine which of a first firmware storage area and a second firmware storage area is a firmware storage area to be updated. The host is configured to execute the update tool to write the firmware to be updated including the digital signature into the firmware storage area to be update. In response to a completion of writing the firmware to be updated including the digital signature into the firmware storage area to be updated, the electronic device is configured to execute the original firmware, and verify the digital signature by using a signature verification algorithm, and in response to the electronic device successfully verifying the digital signature, an update is completed.

Therefore, the firmware updating system and method provided by the present disclosure can prevent malicious firmware from being written into the electronic device by illegal update tools. In addition, when a user uses an authorized tool to update the firmware, since private keys encapsulated in the update tool provided by different electronic device manufacturers are different, the update tool cannot be universal, which further improves security and reliability of the update tool. Furthermore, during the updating process, since the original firmware is signed and verified, it is possible to check whether there is any data added, deleted, or tampered with in the firmware to ensure integrity and correctness of the firmware to be updated.

On the other hand, the firmware updating system and method provided by the present disclosure alternately update the first firmware storage area and the second firmware storage area. When the firmware update process is terminated due to unexpected situations such as power failure, the electronic device can still operate normally. Furthermore, when an update error occurs in one partition in the first firmware storage area and the second firmware storage area, the electronic device can automatically execute the firmware in the other partition to return to the firmware version before the update to ensure the normal operation of the electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
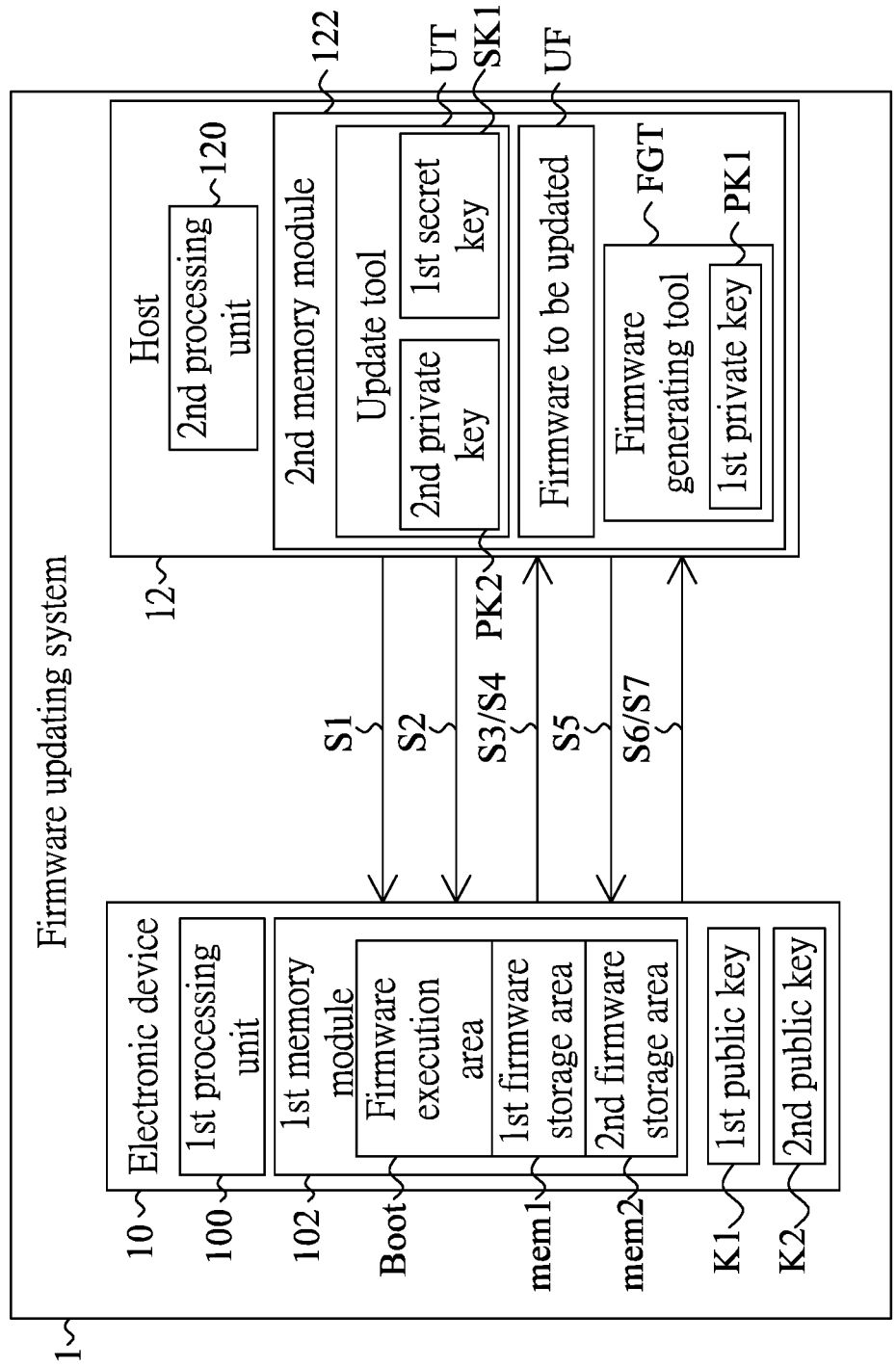
FIG. 1 is a block diagram of a firmware updating system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
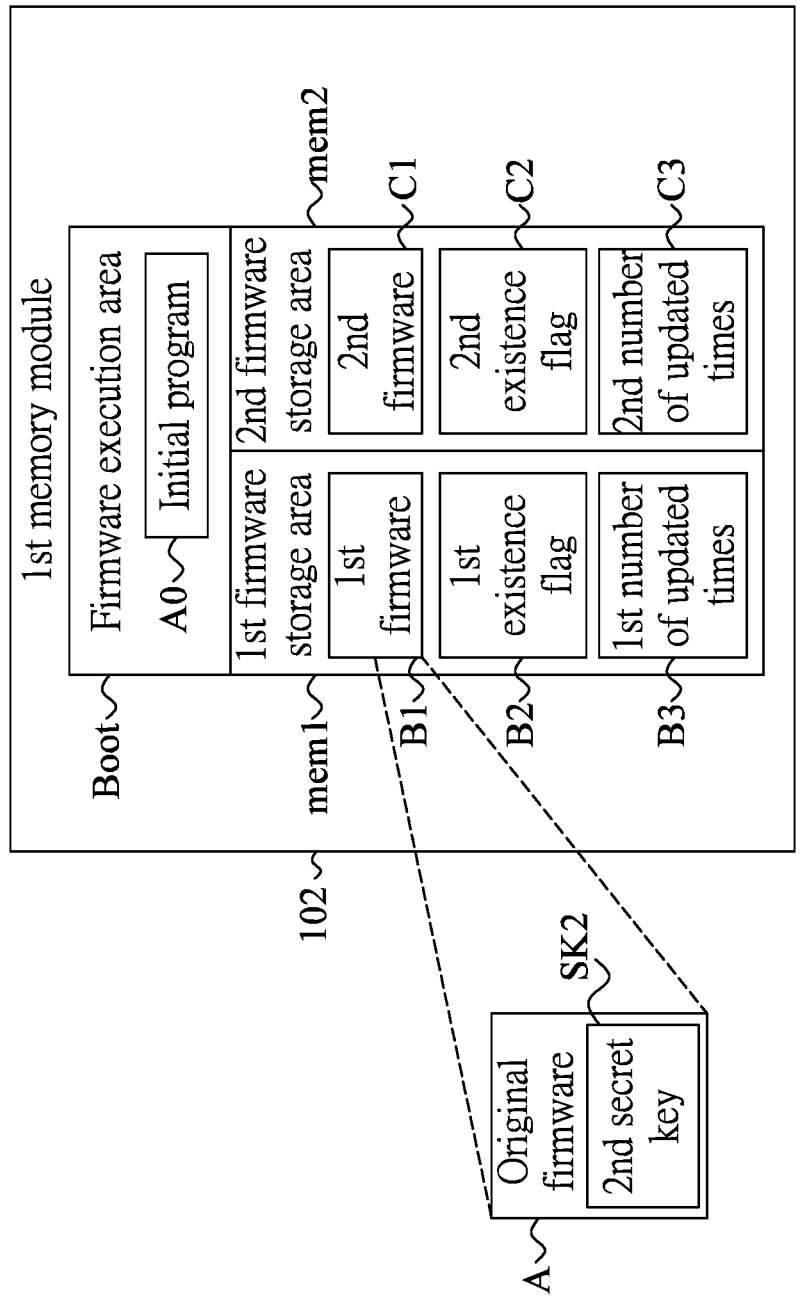
FIG. 2 is a schematic configuration diagram of a first memory module according to the embodiment of the present disclosure.

Reference is made to FIGS. 1 and 2, FIG. 1 is a block diagram of a firmware updating system according to an embodiment of the present disclosure, and FIG. 2 is a schematic configuration diagram of a first memory module according to the embodiment of the present disclosure.

Reference is made to FIG. 1 and FIG. 2, the first embodiment of the present disclosure provides a firmware updating system 1, which includes an electronic device 10 and a host 12.

The electronic device 10 includes a first processing unit 100 and a first memory module 102. The first processing unit 100 can be, for example, a central processing unit (CPU) or a baseboard management controller (BMC), and the first memory module 102 can be, for example, an electrically erasable programmable read-only memory (EEPROM), a programmable read-only memory (PROM), a flash memory, and the like. The first memory module 102 is mainly used for storing firmware and includes a firmware execution area Boot, a first firmware storage area mem1, and a second firmware storage area mem2.

The firmware execution area Boot stores an initial program A0, and at least one of the first firmware storage area mem1 and the second firmware storage area mem2 stores an original firmware A, for example, a first firmware B1 or a second firmware C1 is the original firmware A. The firmware execution area Boot can execute the initial program A0 to load the original firmware A from the first firmware storage area mem1 or the second firmware storage area mem2 when the electronic device 10 is turned on.

On the other hand, the host 12 is configured to be communicatively connected to the electronic device 10. The host 12 includes a second processing unit 120 and a second memory module 122. Similarly, the second processing unit 120 can be, for example, a central processing unit (CPU) or a baseboard management controller (BMC), and the second memory module 122 can be, for example, an electrically erasable programmable read-only memory (EEPROM), a programmable read-only memory (PROM), a flash memory, and the like. The second memory module 122 stores an update tool UT, a firmware to be updated UF, and a firmware generating tool FGT.

Figure 3:
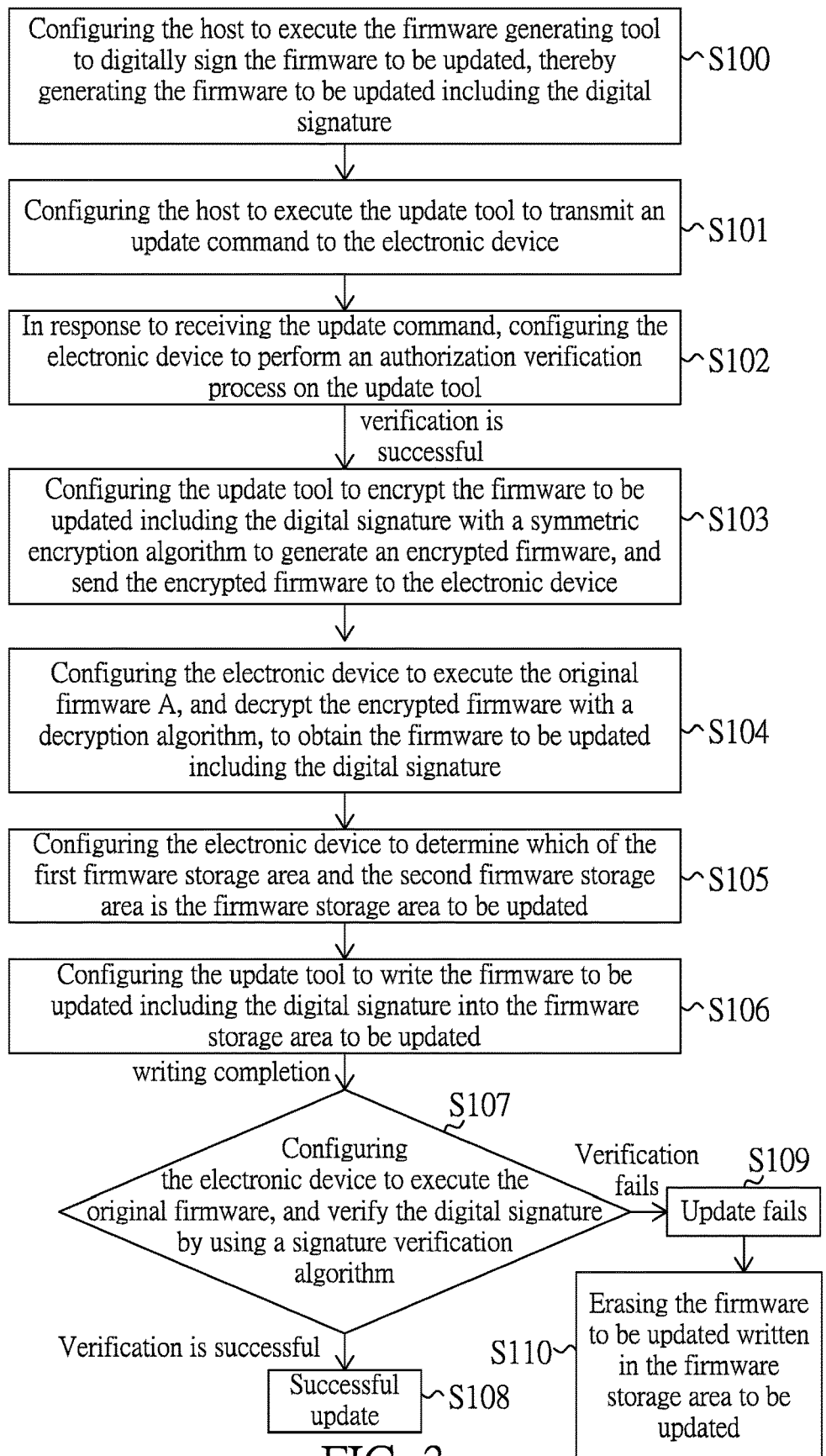
FIG. 3 is a flowchart of a firmware updating method according to the embodiment of the present disclosure.

Reference is further made to FIG. 3, which is a flowchart of a firmware updating method according to the embodiment of the present disclosure. As shown in FIG. 3, the present disclosure provides a firmware updating method, which is applicable to the above-mentioned firmware updating system 1 including the host 12 and the electronic device 10. In detail, the firmware updating method of the present disclosure is essentially a safe manner to update the firmware of an electronic device online, and is mainly embodied in a protection mechanism when the original firmware A of the electronic device 10 is updated, and in a recovery mechanism provided when the firmware update fails. As shown in FIG. 3, the firmware updating method includes the following steps:

Step S100: configuring the host 12 to execute the firmware generating tool FGT to digitally sign the firmware to be updated UF, thereby generating the firmware to be updated UF including the digital signature. For example, the firmware to be updated UF may be a firmware with the latest version obtained from the manufacturer of the electronic device 10 when the host 12 executes the update tool UT. In this step, the host 12 can be configured to execute a digital signature algorithm, for example, an Elliptic Curve Digital Signature Algorithm (ECDSA), and digitally sign the firmware to be updated UF according to a first private key PK1.

In detail, in this embodiment, step S100 is digitally signed based on the firmware to be updated UF, the private key for digital signing (that is, the aforementioned first private key PK1) is encapsulated in the firmware generating tool FGT, and the public key used to verify the digital signature is stored in the electronic device 10.

Step S101: configuring the host 12 to execute the update tool UT to transmit an update command S1 to the electronic device 10.

Step S102: in response to receiving the update command S1, configuring the electronic device 10 to perform an authorization verification process on the update tool UT. In detail, after the electronic device 10 receives the update command S1 sent by the update tool UT, the electronic device 10 first confirms an authority of the update tool UT of the user. The present disclosure can provide different update tools for different users, and the present disclosure is not limited thereto.

Figure 4:
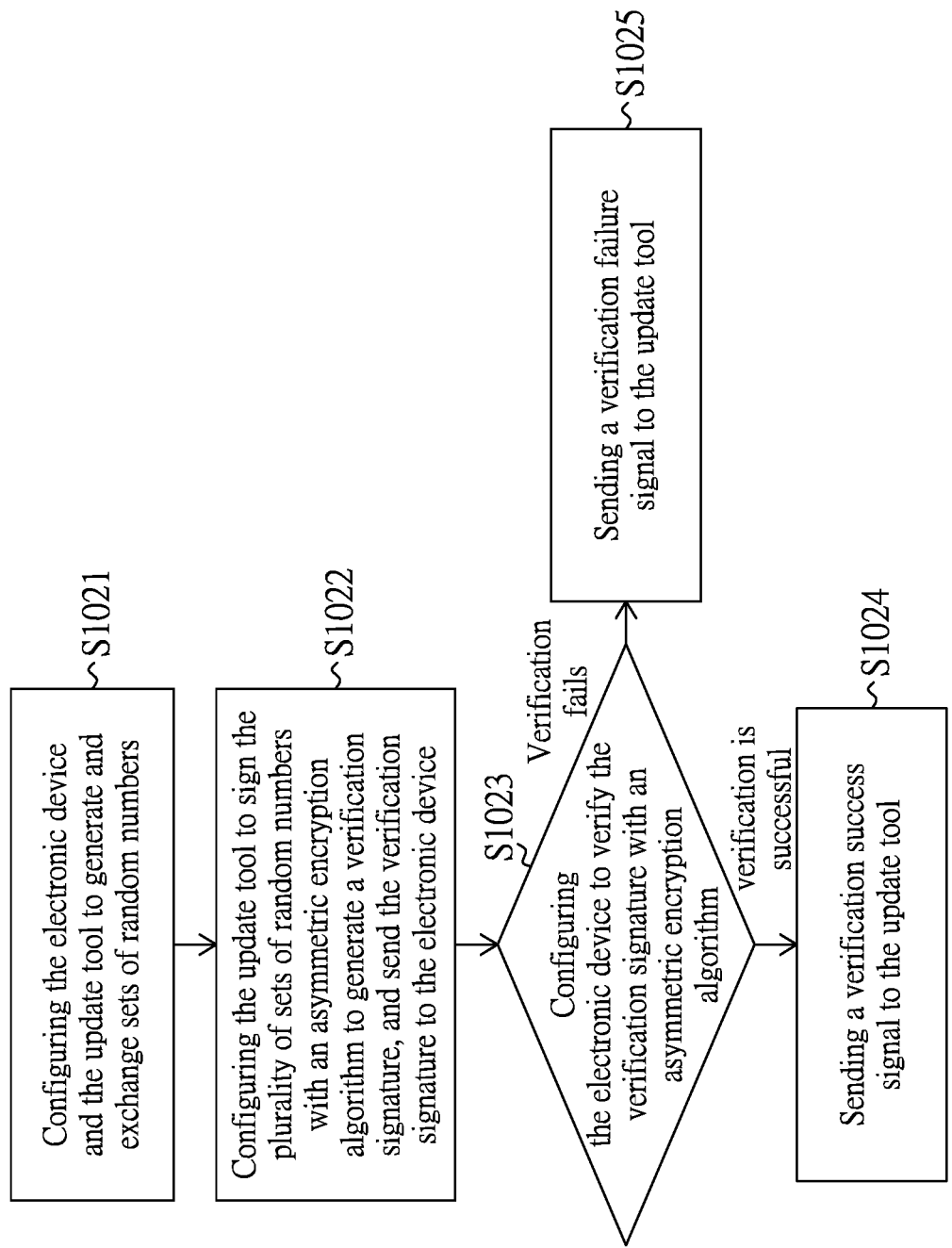
FIG. 4 is a flowchart of an authorization verification process according to the embodiment of the present disclosure.

Reference can be further made to FIG. 4, which is a flowchart of an authorization verification process according to the embodiment of the present disclosure. As shown in FIG. 4, the authorization verification process includes:

Step S1021: configuring the electronic device 10 and the update tool UT to generate and exchange a plurality of sets of random numbers.

Step S1022: configuring the update tool UT to sign the plurality of sets of random numbers with an asymmetric encryption algorithm to generate a verification signature S2, and send the verification signature S2 to the electronic device.

Figure 5:
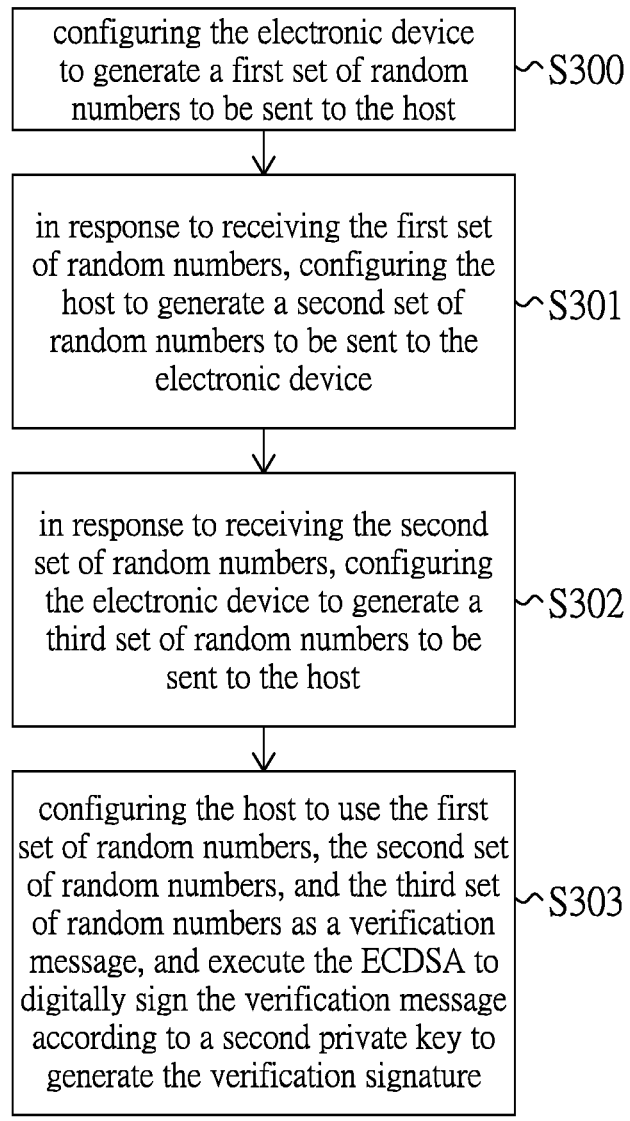
FIG. 5 is a flowchart of an authorization verification process according to a specific embodiment of the present disclosure.

Reference can be further made to FIG. 5, which is a flowchart of an authorization verification process according to a specific embodiment of the present disclosure. In a specific embodiment, step S1021 to step S1022 further include the following steps:

Step S300: configuring the electronic device 10 to generate a first set of random numbers to be sent to the host 12.

Step S301: in response to receiving the first set of random numbers, configuring the host 12 to generate a second set of random numbers to be sent to the electronic device 10.

Step S302: in response to receiving the second set of random numbers, configuring the electronic device 10 to generate a third set of random numbers to be sent to the host 12.

Step S303: configuring the host 12 to use the first set of random numbers, the second set of random numbers, and the third set of random numbers as a verification message, and execute the ECDSA to digitally sign the verification message according to a second private key PK2 to generate the verification signature S2. In specific embodiments, the firmware manufacturer can provide the user with an update tool UT embedded with a private key (i.e., the second private key PK2).

Step S1023: configuring the electronic device 10 to verify the verification signature S2 with an asymmetric encryption algorithm. In step S1023, the asymmetric encryption algorithm can also be, for example, ECDSA. Therefore, step S1023 can further include configuring the electronic device 10 to execute the ECDSA and verify the verification signature according to a second public key K2. The second public key K2 is built in the electronic device 10, and the second public key K2 has a pairing relationship with the second private key PK2.

If the verification is successful, the authorization verification process proceeds to step S1024: sending a verification success signal S3 to the update tool UT, otherwise, the authorization verification process proceeds to step S1025: sending a verification failure signal S4 to the update tool UT.

In the above steps, if any step fails, it will return directly and the update tool UT is not allowed to update the firmware.

In response to receiving the verification success signal S3, the firmware updating method further proceeds to step S103: configuring the update tool UT to encrypt the firmware to be updated UF including the digital signature with a symmetric encryption algorithm to generate an encrypted firmware S5, and send the encrypted firmware S5 to the electronic device 10.

After the update tool UT passes the verification, the update tool UT can further use an embedded key to encrypt the original firmware including the digital signature for users to download and use. Firmware encryption can prevent data from being maliciously tampered with and embezzled to a certain extent during transmission. Therefore, step S103 can further include configuring the update tool UT to encrypt the firmware to be updated UF including the digital signature according to the first secret key SK1 using a symmetric encryption algorithm.

Then, the firmware updating method proceeds to step S104: configuring the electronic device 10 to execute the original firmware A, and decrypt the encrypted firmware S5 with a decryption algorithm, to obtain the firmware to be updated UF including the digital signature. This step corresponds to step S103. Therefore, step S104 can further include configuring the electronic device 10 to decrypt the encrypted firmware with the decryption algorithm according to the second secret key SK2 to obtain the firmware to be updated UT including the digital signature. The update tool UT uses a symmetric encryption algorithm to encrypt the firmware to be updated UF including the digital signature based on the first secret key SK1. The symmetric encryption algorithm has only one non-public key, which is stored in the electronic device 10 and the update tool UT. In other words, the security of the firmware can be further protected by ensuring the security of the key. In a specific embodiment, the key can be kept by the firmware manufacturer to prevent security breach, but the present disclosure is not limited thereto. Therefore, in this embodiment, the first key SK1 is the same as the second key SK2.

Step S105: configuring the electronic device 10 to determine which of the first firmware storage area mem1 and the second firmware storage area mem2 is the firmware storage area to be updated. In detail, the non-volatile storage space of the electronic device 10 can be divided into two partitions, the first firmware storage area mem1 and the second firmware storage area mem2, and based on this, the memory partition that needs to be firmware updated is determined. The structure of each memory partition of the electronic device 10 for storing the firmware is shown in FIG. 2. The first firmware storage area mem1 can further store a first existence flag B2 and a first number of updated times B3, and the second firmware storage area mem2 can further store a second existence flag C2 and a second number of updated times C3.

Figure 6:
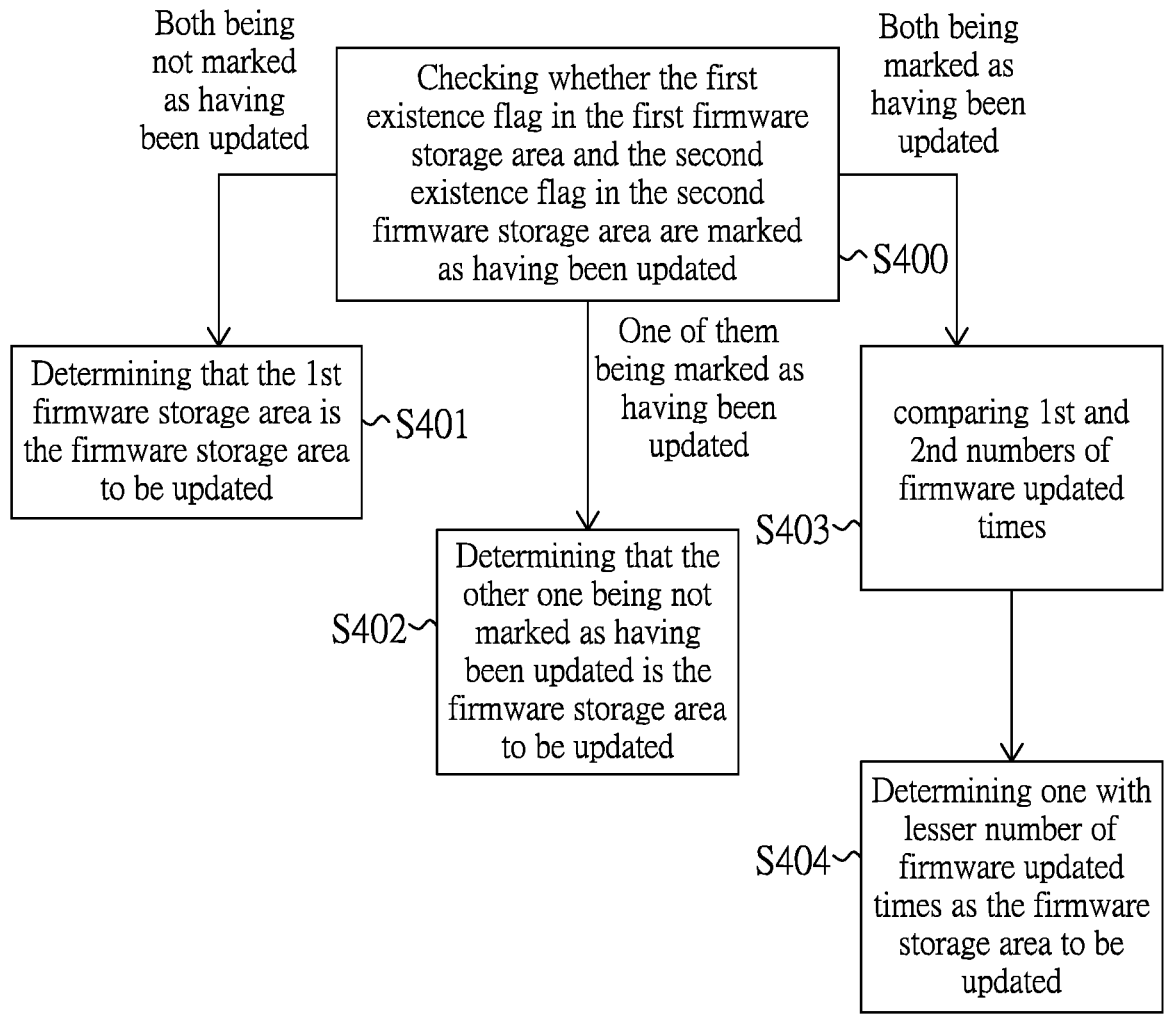
FIG. 6 is a flowchart of steps for determining a firmware storage area to be updated according to the embodiment of the present disclosure.

Therefore, reference can be made to FIG. 6, which is a flowchart of steps for determining a firmware storage area to be updated according to an embodiment of the present disclosure. Step S105 can further include the following steps:

Step S400: checking whether the first existence flag B2 in the first firmware storage area mem1 and the second existence flag C2 in the second firmware storage area mem2 are marked as having been updated.

In response to the first existence flag B2 and the second existence flag C2 being not marked as having been updated, the method proceeds to step S401: determining that the first firmware storage area mem1 is the firmware storage area to be updated.

In response to one of the first existence flag B2 and the second existence flag C2 being marked as having been updated, the method proceeds to step S402: determining that the other one being not marked as having been updated is the firmware storage area to be updated.

In response to the first existence flag B2 and the second existence flag C2 being both marked as having been updated, the method proceeds to step S403: comparing the first number of firmware updated times B3 in the first firmware storage area mem1 and the second number of firmware updated times C3 in the second firmware storage area mem2 The method proceeds to step S404: determining one with lesser number of firmware updated times as the firmware storage area to be updated.

For further example, after each firmware update is completed, the existence flag and updated times of the current memory partition are updated. By checking the firmware updated times and the existence flags of the two memory partitions, memory addressing spaces written in the firmware update are determined. When the firmware existence flags of the first firmware storage area mem1 and the second firmware storage area mem2 are not set (for example, the value is 0), the firmware is updated to the first firmware storage area mem1, when the existence flag of one and only one of the two partitions is not set, the firmware is updated to that partition. When the existence flags of the first firmware storage area mem1 and the second firmware storage area mem2 are set at the same time (for example, values are both 1), the firmware updated times of the two partitions are compared. If the firmware updated times of the first firmware storage area mem1 are greater than that of the second firmware storage area mem2, it means that a current firmware version update time of the first firmware storage area mem1 is later than that of the second firmware storage area mem2, and the firmware in the second firmware storage area mem2 needs to be updated, otherwise, the firmware of the first firmware storage area mem1 is updated.

Therefore, when the update process is unexpectedly terminated or an update error occurs, the electronic device 10 can automatically execute the firmware in another partition and return to the firmware version before the update, to ensure the normal operation of the electronic device 10.

After the firmware storage area to be updated is determined, the method proceeds to step S106: configuring the update tool UT to write the firmware to be updated UF including the digital signature into the firmware storage area to be updated.

Step S107: in response to a completion of writing the firmware to be updated UF including the digital signature into the firmware storage area to be updated, configuring the electronic device 10 to execute the original firmware A, and verify the digital signature by using a signature verification algorithm. In this case, for example, the signature verification algorithm can also be ECDSA. Therefore, step S107 can further include configuring the electronic device 10 to perform ECDSA and verify the digital signature according to the first public key K1, in which the first public key K1 is built in the electronic device 10. In a specific embodiment, the public key can be embedded in the electronic device 10 when the electronic device 10 is shipped from the factory, and cannot be modified afterward. The first public key K1 has a pairing relationship with the first private key PK1.

If the verification is successful, the method proceeds to step S108, since the update is successful, the electronic device 10 can be configured to return an update success message S6, while setting the existence flag of the updated partition (for example, changing the value thereof from 0 to 1), and the number of updated times is increased by 1. Further, after this firmware update is successful, the firmware to be updated can be written to another partition for alternate update according to information indicated by the existence flag. If the verification fails, the method proceeds to step S109, which represents the update failed.

If the update fails, the method proceeds to step S110: erasing the firmware to be updated UF written in the firmware storage area to be updated, and sending an error message S7 to the update tool UT.

In the above embodiments of the present disclosure, all the encryption algorithms, decryption algorithms, and digital signature algorithms involved in the above steps are not limited. The encryption algorithm, decryption algorithm, and digital signature algorithm can be any algorithm that can be implemented in the existing technology. When performing decryption and signature verification on the received encrypted firmware, the decryption algorithm corresponds to the encryption algorithm, and the signature verification algorithm corresponds to the signature algorithm. Similarly, when the authorization verification process is performed on the update tool, the encryption algorithm also corresponds to the decryption algorithm.

In conclusion, the firmware updating system and method provided by the present disclosure can prevent the electronic device from being written into malicious firmware by illegal update tools. In addition, when a user uses an authorized tool to update the firmware, since private keys encapsulated in the update tool provided by different electronic device manufacturers are different, the update tool cannot be universal, which further improves security and reliability of the update tool. Furthermore, during the updating process, since the original firmware is signed and verified, it is possible to check whether there is any data added, deleted, or tampered with in the firmware to ensure integrity and correctness of the firmware to be updated.

On the other hand, the firmware updating system and method provided by the present disclosure alternately update the first firmware storage area and the second firmware storage area. When the firmware update process is terminated due to unexpected situations such as power failure, the electronic device can still operate normally. Furthermore, when an update error occurs in one partition in the first firmware storage area and the second firmware storage area, the electronic device can automatically execute the firmware in the other partition to return to the firmware version before the update to ensure the normal operation of the electronic device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A firmware updating method, applicable for a firmware updating system including a host and an electronic device, the host configured to be communicatively connected to the electronic device and store a firmware to be updated, the firmware updating method comprising:
    configuring the host to execute a firmware generating tool to digitally sign the firmware to be updated, thereby generating the firmware to be updated including a digital signature;
    configuring the host to execute an update tool to transmit an update command to the electronic device;
    in response to the electronic device receiving the update command, configuring the electronic device to perform an authorization verification process on the update tool, wherein the authorization verification process includes:
        configuring the electronic device and the update tool to generate and exchange a plurality of sets of random numbers;
        configuring the update tool to sign the plurality of sets of random numbers with an asymmetric encryption algorithm to generate a verification signature, and send the verification signature to the electronic device; and
        configuring the electronic device to verify the verification signature using the asymmetric encryption algorithm, and in response to the electronic device successfully verifying the verification signature, configuring the electronic device to send a verification success signal to the update tool, or otherwise, send a verification failure signal to the update tool;
    in response to the update tool receiving the verification success signal, configuring the update tool to encrypt the firmware to be updated including the digital signature with a symmetric encryption algorithm to generate an encrypted firmware, and send the encrypted firmware to the electronic device;
    configuring the electronic device to execute an original firmware, and decrypt the encrypted firmware with a decryption algorithm to obtain the firmware to be updated including the digital signature;
    configuring the electronic device to determine which of a first firmware storage area and a second firmware storage area is a firmware storage area to be updated according to a first existence flag in the first firmware storage area and a second existence flag in the second firmware storage area;
    configuring the update tool to write the firmware to be updated including the digital signature into one of the first firmware storage area and the second firmware storage area that is determined as the firmware storage area to be updated; and
    in response to a completion of writing the firmware to be updated including the digital signature into the firmware storage area to be updated, configuring the electronic device to execute the original firmware, and verify the digital signature by using a signature verification algorithm, wherein, in response to the electronic device successfully verifying the digital signature, an update is completed.

2. The firmware updating method according to claim 1, wherein the step of configuring the host to execute the firmware generating tool to digitally sign the firmware to be updated, so as to generate the firmware to be updated including the digital signature further includes:
    configuring the host to execute an elliptic curve digital signature algorithm (ECDSA), and digitally sign the firmware to be updated according to a first private key.

3. The firmware updating method according to claim 2, wherein the step of configuring the electronic device to execute the original firmware and verify the digital signature using the signature verification algorithm further includes:
    configuring the electronic device to execute the ECDSA, and verify the digital signature according to a first public key,
    wherein the first public key has a pairing relationship with the first private key.

4. The firmware updating method according to claim 1, wherein the step of configuring the electronic device and the update tool to generate and exchange the plurality of sets of random numbers, and configuring the update tool to sign the plurality of sets of random numbers with the asymmetric encryption algorithm to generate the verification signature, and send the verification signature to the electronic device further includes:
  configuring the electronic device to generate a first set of random numbers to be sent to the host;
  in response to receiving the first set of random numbers, configuring the host to generate a second set of random numbers to be sent to the electronic device;
  in response to receiving the second set of random numbers, configuring the electronic device to generate a third set of random numbers to be sent to the host; and
  configuring the host to use the first set of random numbers, the second set of random numbers, and the third set of random numbers as a verification message, and execute an ECDSA to digitally sign the verification message according to a second private key to generate the verification signature.

5. The firmware updating method of claim 4, wherein the step of configuring the electronic device to verify the verification signature with the asymmetric encryption algorithm further includes:
  configuring the electronic device to execute the ECDSA, and verify the verification signature according to a second public key,
  wherein the second public key has a pairing relationship with the second private key.

6. The firmware updating method according to claim 1, wherein the step of configuring the update tool to encrypt the firmware to be updated including the digital signature with the symmetric encryption algorithm to generate the encrypted firmware further includes:
  configuring the update tool to encrypt the firmware to be updated including the digital signature with the symmetric encryption algorithm according to a first secret key.

7. The firmware updating method according to claim 6, wherein the step of configuring the electronic device to execute the original firmware, and decrypt the encrypted firmware with the decryption algorithm to obtain the firmware update including the digital signature further includes:
  configuring the electronic device to decrypt the encrypted firmware with the decryption algorithm according to a second secret key to obtain the firmware to be updated including the digital signature,
  wherein the first secret key and the second secret key are the same.

8. The firmware updating method according to claim 1, wherein the step of configuring the electronic device to determine which of the first firmware storage area and the second firmware storage area is the firmware storage area to be updated further includes:
  checking whether the first existence flag in the first firmware storage area and the second existence flag in the second firmware storage area are marked as having been updated,
  wherein, in response to the first existence flag and the second existence flag being not marked as having been updated, determining that the first firmware storage area is the firmware storage area to be updated;
  wherein, in response to one of the first existence flag and the second existence flag being marked as having been updated, determining that another one of the first and second firmware storage areas being not marked as having been updated is the firmware storage area to be updated.

9. The firmware updating method according to claim 8, further comprising: in response to the first existence flag and the second existence flag being both marked as having been updated, comparing a first number of firmware updated times in the first firmware storage area and a second number of firmware updated times in the second firmware storage area, and determining one of the first and second firmware storage areas with a lesser number of firmware updated times as the firmware storage area to be updated.

10. The firmware updating method according to claim 1, wherein, in the step of configuring the electronic device to execute the original firmware and verify the digital signature using the signature verification algorithm, in response to the electronic device failing to verify the digital signature, configuring the electronic device to erase the firmware to be updated that has been written into the firmware storage area to be updated, and send an error message to the update tool.

11. A firmware updating system, comprising:
  an electronic device, including:
    a first processing unit; and
    a first memory module, including:
      a firmware execution area, storing an initial program; and
      a first firmware storage area and a second firmware storage area,
    wherein at least one of the first firmware storage area and the second firmware storage area stores an original firmware; and
  a host configured to be communicatively connected to the electronic device, wherein the host includes:
    a second processing unit; and
    a second memory module storing an update tool, a firmware to be updated and a firmware generating tool,
  wherein the host is configured to execute the firmware generating tool to digitally sign the firmware to be updated, so as to generate the firmware to be updated including a digital signature;
  wherein the host is configured to execute the update tool to transmit an update command to the electronic device;
  wherein, in response to the electronic device receiving the update command, the electronic device is configured to perform an authorization verification process on the update tool, and wherein the authorization verification process includes:
    configuring the electronic device and the update tool to generate and exchange a plurality of sets of random numbers;
    configuring the update tool to sign the plurality of sets of random numbers with an asymmetric encryption algorithm to generate a verification signature, and send the verification signature to the electronic device; and
    configuring the electronic device to verify the verification signature using the asymmetric encryption algorithm, and in response to the electronic device successfully verifying the verification signature, configuring the electronic device to send a verification success signal to the update tool, otherwise, send a verification failure signal to the update tool;
  wherein, in response to the update tool receiving the verification success signal, the update tool is configured to encrypt the firmware to be updated including the digital signature with a symmetric encryption algorithm to generate an encrypted firmware, and send the encrypted firmware to the electronic device;
  wherein the electronic device is configured to execute the original firmware, and decrypt the encrypted firmware with a decryption algorithm to obtain the firmware to be updated including the digital signature;

wherein the electronic device is configured to determine which of the first firmware storage area and the second firmware storage area is the firmware storage area to be updated according to a first existence flag in the first firmware storage area and a second existence flag in the second firmware storage area;

wherein the host is configured to execute the update tool to write the firmware to be updated including the digital signature into one of the first firmware storage area and the second firmware storage area that is determined as the firmware storage area to be updated;

wherein, in response to a completion of writing the firmware to be updated including the digital signature into the firmware storage area to be updated, the electronic device is configured to execute the original firmware, and verify the digital signature by using a signature verification algorithm, and wherein, in response to the electronic device successfully verifying the digital signature, an update is completed.

12. The firmware updating system according to claim 11, wherein, when the host is configured to execute the firmware generating tool to digitally sign the firmware to be updated, so as to generate the firmware to be updated including the digital signature, the host is configured to execute an elliptic curve digital signature algorithm (ECDSA), and digitally sign the firmware to be updated according to a first private key.

13. The firmware updating system according to claim 12, wherein, when the electronic device is configured to execute the original firmware and verify the digital signature using the signature verification algorithm, the electronic device is further configured to execute the ECDSA, and verify the digital signature according to a first public key, and wherein the first public key has a pairing relationship with the first private key.

14. The firmware updating system according to claim 11, wherein the step of configuring the electronic device and the update tool to generate and exchange the plurality of sets of random numbers, and configuring the update tool to sign the plurality of sets of random numbers with the asymmetric encryption algorithm to generate the verification signature, and send the verification signature to the electronic device further includes:

configuring the electronic device to generate a first set of random numbers to be sent to the host;

in response to receiving the first set of random numbers, configuring the host to generate a second set of random numbers to be sent to the electronic device;

in response to receiving the second set of random numbers, configuring the electronic device to generate a third set of random numbers to be sent to the host; and configuring the host to use the first set of random numbers, the second set of random numbers, and the third set of random numbers as a verification message, and execute an elliptic curve digital signature algorithm (ECDSA) to digitally sign the verification message according to a second private key to generate the verification signature.

15. The firmware updating system of claim 14, wherein, when the electronic device is configured to verify the verification signature with the asymmetric encryption algorithm, the electronic device is further configured to execute the ECDSA, and verify the verification signature according to a second public key, and wherein the second public key has a pairing relationship with the second private key.

16. The firmware updating system according to claim 11, wherein, when the host is configured to execute the update tool to encrypt the firmware to be updated including the digital signature with the symmetric encryption algorithm to generate the encrypted firmware, the host is further configured to execute the update tool to encrypt the firmware to be updated including the digital signature with the symmetric encryption algorithm according to a first secret key.

17. The firmware updating system according to claim 16, wherein, when the electronic device is configured to execute the original firmware, and decrypt the encrypted firmware with the decryption algorithm to obtain the firmware update including the digital signature, the electronic device is further configured to decrypt the encrypted firmware with the decryption algorithm according to a second secret key to obtain the firmware to be updated including the digital signature, and wherein the first secret key and the second secret key are the same.

18. The firmware updating system according to claim 11, wherein, when the electronic device is configured to determine which of the first firmware storage area and the second firmware storage area is the firmware storage area to be updated, the electronic device is further configured to check whether the first existence flag in the first firmware storage area and the second existence flag in the second firmware storage area are marked as having been updated, wherein, in response to the first existence flag and the second existence flag being not marked as having been updated, determining that the first firmware storage area is the firmware storage area to be updated;

wherein, in response to one of the first existence flag and the second existence flag being marked as having been updated, determining that another one being not marked as having been updated is the firmware storage area to be updated.

19. The firmware updating system according to claim 18, wherein, in response to the first existence flag and the second existence flag being both marked as having been updated, the electronic device is further configured to compare a first number of firmware updated times in the first firmware storage area and a second number of firmware updated times in the second firmware storage area, and determining one with lesser number of firmware updated times as the firmware storage area to be updated.

20. The firmware updating system according to claim 11, wherein, when the electronic device is configured to execute the original firmware and verify the digital signature using the signature verification algorithm, in response to the electronic device failing to verify the digital signature, the electronic device is configured to erase the firmware to be updated that has been written into the firmware storage area to be updated, and send an error message to the update tool.

* * * * *